US009145902B2

(12) United States Patent
Poskie et al.

(10) Patent No.: US 9,145,902 B2
(45) Date of Patent: Sep. 29, 2015

(54) HYDRAULIC ACCUMULATOR

(75) Inventors: Fredrick R. Poskie, Plymouth, MI (US); Leonid Basin, Farmington Hills, MI (US); Carlos E. Marin, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

(21) Appl. No.: 13/176,401

(22) Filed: Jul. 5, 2011

(65) Prior Publication Data

US 2012/0085451 A1 Apr. 12, 2012

Related U.S. Application Data

(60) Provisional application No. 61/391,305, filed on Oct. 8, 2010.

(51) Int. Cl.
*F16L 55/04* (2006.01)
*F15B 1/04* (2006.01)

(52) U.S. Cl.
CPC ............... *F15B 1/04* (2013.01); *F15B 2201/21* (2013.01); *F15B 2201/31* (2013.01); *F15B 2201/4056* (2013.01)

(58) Field of Classification Search
CPC ............... F15B 1/04; F15B 2201/4056; F15B 2201/31; F15B 2201/21
USPC ........................... 138/31, 26, 30; 92/132, 182
See application file for complete search history.

(56) References Cited

U.S. PATENT DOCUMENTS

| | | | | | |
|---|---|---|---|---|---|
| 300,917 | A | * | 6/1884 | Story | 138/31 |
| 2,347,932 | A | * | 5/1944 | Bush | 138/31 |
| 2,381,203 | A | * | 8/1945 | Bush | 200/443 |
| 2,700,488 | A | * | 1/1955 | Rafferty | 222/71 |
| 2,764,997 | A | * | 10/1956 | McCuistion | 138/31 |
| 3,317,002 | A | * | 5/1967 | McKenzie | 184/7.4 |

* cited by examiner

*Primary Examiner* — J. Casimer Jacyna

(57) ABSTRACT

A hydraulic accumulator includes a cylindrical body or housing having male or external threads on each end and shoulders proximate the ends of the threads nearer the center of the cylindrical body or housing that act as stops. An end cap having internal or female threads is disposed at one end of the accumulator. The accumulator may be threaded into a manifold or control valve assembly or it may include a second threaded end cap having an access, i.e., inlet/outlet, port. A piston resides within the accumulator and is biased by a pair of compression springs toward the manifold, control valve body or second threaded end cap.

17 Claims, 5 Drawing Sheets

HYDRAULIC ACCUMULATOR

CROSS REFERENCE TO RELATED APPLICATION

This application claims the benefit of U.S. Provisional Patent Application Ser. No. 61/391,305, filed Oct. 8, 2010, which is hereby incorporated in its entirety herein by reference.

FIELD

The present disclosure relates to hydraulic accumulators and more specifically to hydraulic accumulators fabricated from a cylinder having external threads with adjacent shoulder stops and end closures.

BACKGROUND

The statements in this section merely provide background information related to the present disclosure and may or may not constitute prior art.

Accumulators are relatively common components in hydraulic circuits and systems. As their name suggests, they are essentially storage devices that accumulate pressurized hydraulic fluid when a supply or flow of hydraulic fluid exceeds the consumption or demand of a system or device. Conversely, when the consumption or demand exceeds supply or flow, the previously stored fluid is exhausted from the accumulator to maintain the desired or necessary pressure or flow.

Hydraulic accumulators take many forms. Those utilized in automatic motor vehicle transmissions which are relatively small are formed by a deep draw operation on a sheet metal blank or plate. Significant post processing is then required to achieve a usable configuration. Another manufacturing process involves welding multiple pieces, such as a plate rolled into a cylinder and two end caps along all of the adjacent edges. Accumulators fabricated of formed tubing or pipe are also known but all of these configurations suffer from drawbacks such as high final cost or leaks between poorly assembled accumulator pieces. It is therefore apparent that improvements in the art of accumulator design and manufacture are desirable and the present invention is so directed.

SUMMARY

The present invention provides a hydraulic accumulator including a cylindrical body or housing having male or external threads on each end and shoulders proximate the ends of the threads nearer the center of the cylindrical body or housing that act as stops. An end cap or closure having internal or female threads is disposed at one end of the accumulator. The accumulator may be threaded into a manifold or control valve assembly or it may include a second threaded end cap having an access, i.e., inlet/outlet, port. A piston resides within the accumulator and is biased by a pair of compression springs toward the manifold, control valve body or second threaded end cap.

Thus it is an aspect of the present invention to provide an improved hydraulic accumulator.

It is a further aspect of the present invention to provide a hydraulic accumulator including a cylindrical body having threads adjacent each end.

It is a still further aspect of the present invention to provide a hydraulic accumulator including a cylindrical body having a circumferential shoulder adjacent threads at each end.

It is a still further aspect of the present invention to provide a hydraulic accumulator including a cylindrical body having a threaded end adapted to be received in a manifold or valve body.

It is a still further aspect of the present invention to provide a hydraulic accumulator including a cylindrical body having threaded ends adapted to receive threaded end caps.

It is a still further aspect of the present invention to provide a hydraulic accumulator including a cylindrical body having an internal piston.

It is a still further aspect of the present invention to provide a hydraulic accumulator including a cylindrical body having a spring biased piston.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, applications, or uses.

Figure 1:
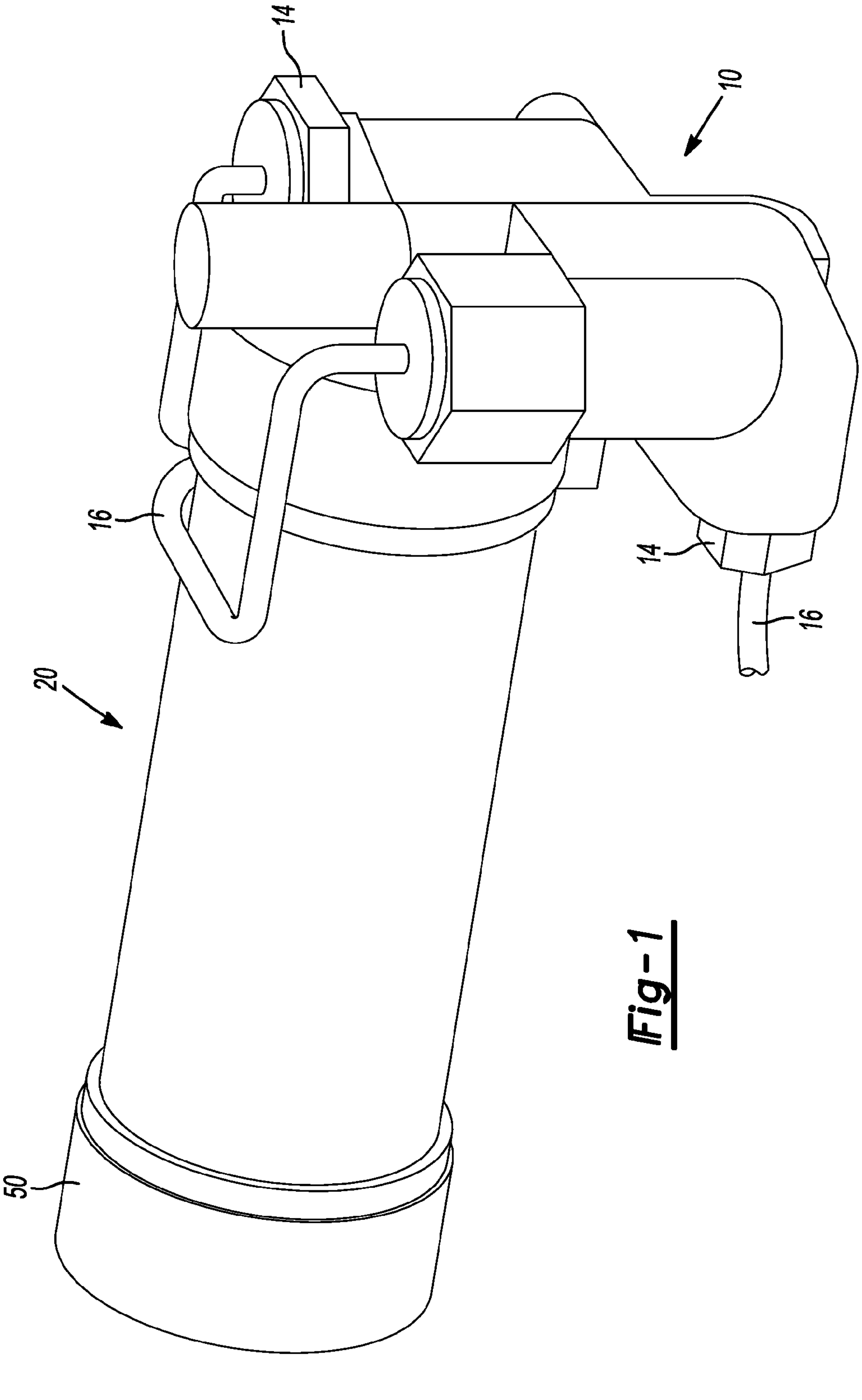
FIG. 1 is a perspective view of a hydraulic accumulator according to the present invention mounted on a transmission control valve body.
Figure 2:
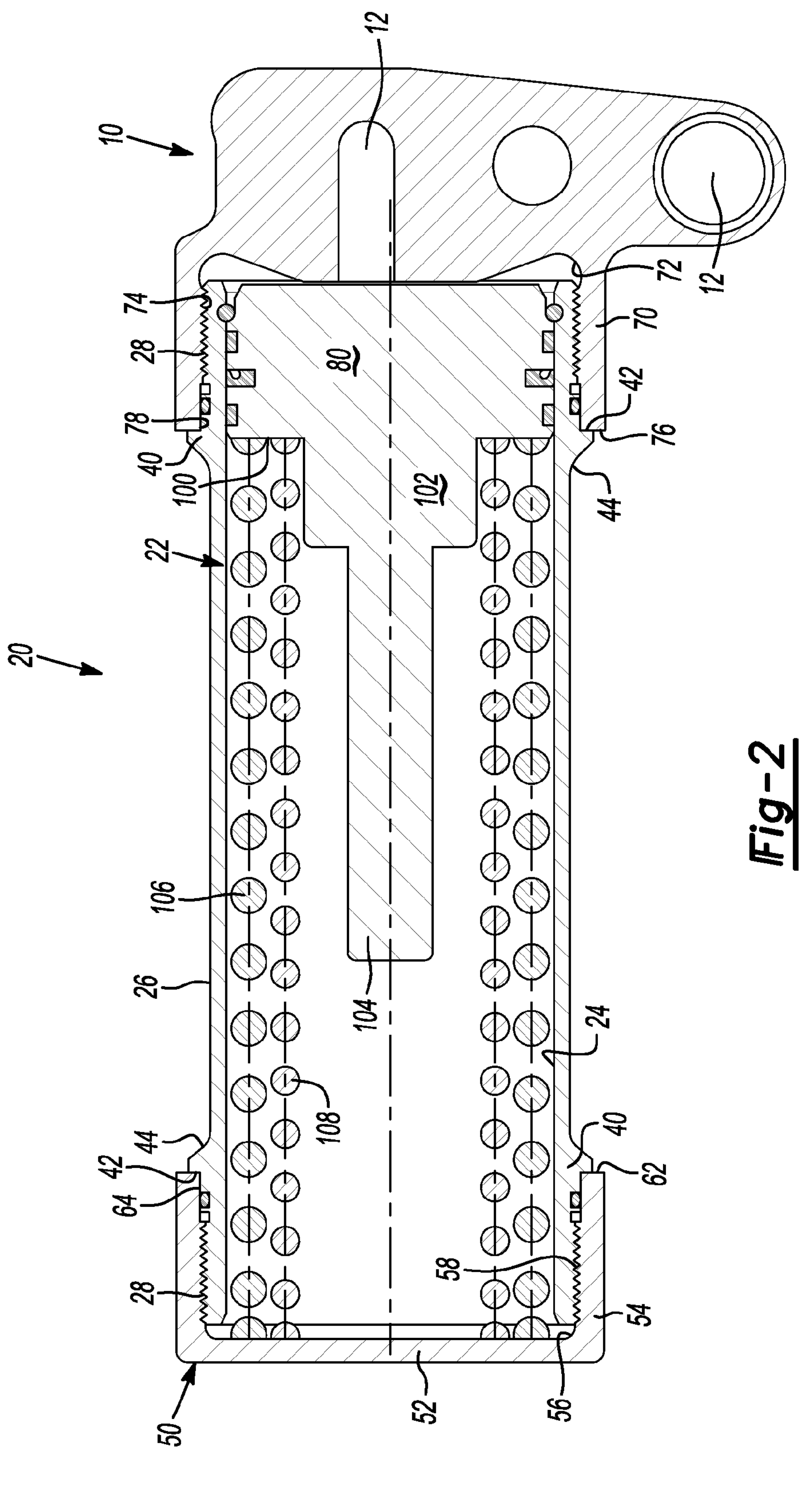
FIG. 2 is a full, sectional view of a hydraulic accumulator according to the present invention.

With reference to FIGS. 1 and 2, a valve body of an automatic transmission is illustrated and generally designated by the reference number 10. The valve body 10 includes various and numerous passageways 12 communicating between a plurality of cylindrical chambers which receive a like plurality of control valve spools (both not illustrated). The valve body 10 also includes hydraulic fittings 14 that secure and connect various hydraulic lines 16 which communicate with other components (not illustrated) of the automatic transmission. The valve body 10 is typically cast and machined aluminum. Secured to the valve body 10 in fluid communication with one of the passageways 12 is a hydraulic accumulator 20 according to the present invention.

Figure 3:
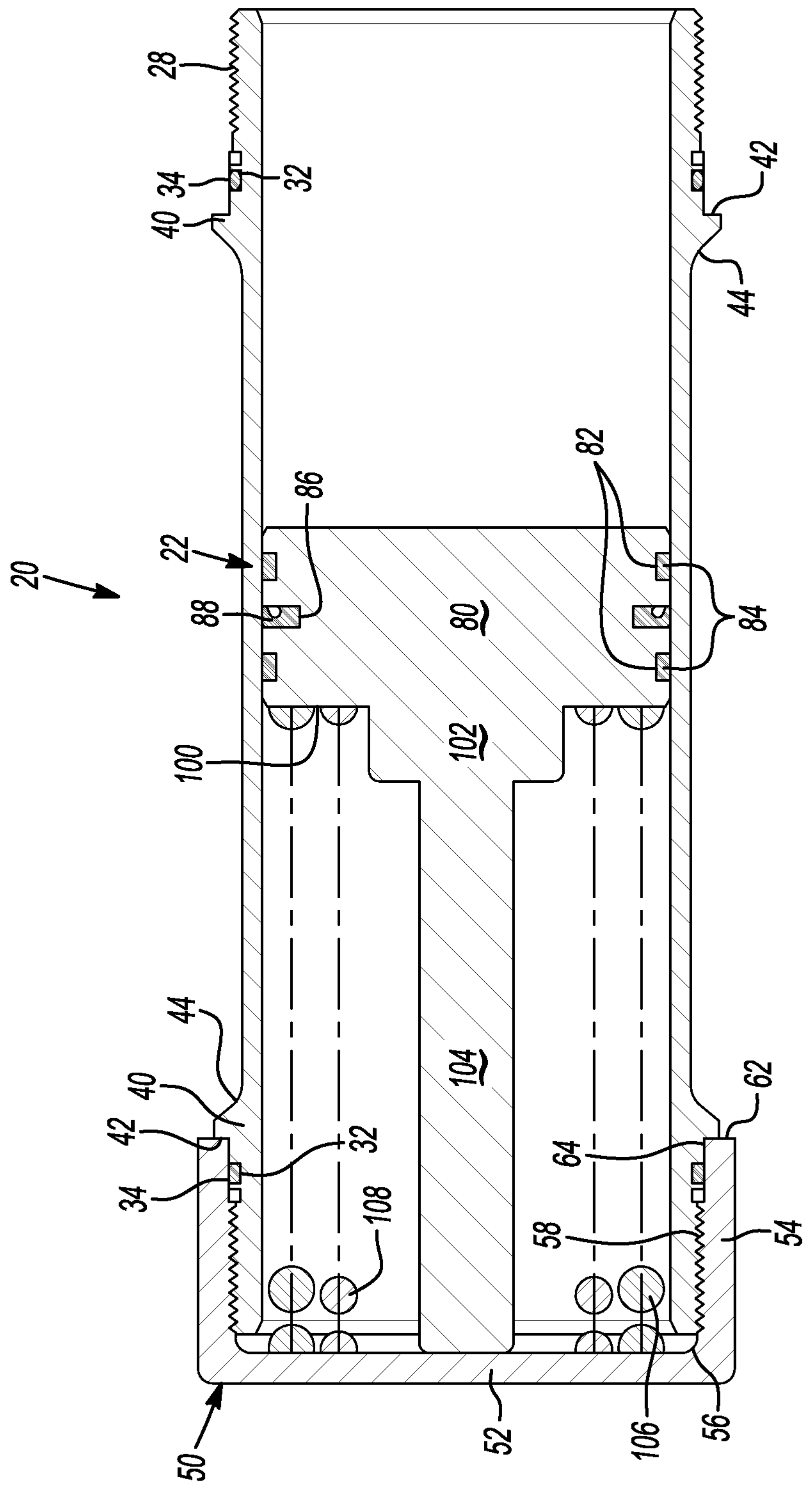
FIG. 3 is a full, sectional view of a hydraulic accumulator according to the present invention at the pressurized limit of piston travel.

Referring now to FIGS. 2 and 3, the hydraulic accumulator 20 includes a central cylindrical body or housing 22 having a smooth, preferably machined, inner surface 24. At each end of the cylindrical body or housing 22 on an outer surface 26 reside male or external threads 28. Preferably, though not necessarily, the threads 28 are the same pitch and configuration. Adjacent each end of the threads 28 nearer the center of the body or housing 22, i.e., opposite the ends of the body or housing 22, is disposed a circumferential channel or groove 32. The channels or grooves 32 each receive and retain an O-ring seal 34 preferably made of an elastomer. And adjacent each channel or groove 32 and the O-ring seal 34 on the side nearer the center of the body or housing 22 and away from the threads 28 is a circumferential stop 40. The circumferential stops 40 are symmetrically disposed and each have a radially oriented, outwardly extending face 42 and a radiused or curved surface 44 nearer the center of the body or housing 22.

At one end of the cylindrical housing or body 22 is an end cap 50. The end cap 50 includes a planar end panel 52 which merges with a circumferential, depending sidewall 54 and is sized to fit over the end of the cylindrical body or housing 22. The inner surface 56 of the depending sidewall includes internal or female threads 58 which are in all respects complementary to the external or male threads 28 on the body or housing 22. The sidewall 54 includes an end surface or shoulder 62 and the axial internal length of the sidewall 54 is somewhat longer than the distance from the outwardly directed face 42 of the circumferential stop 40 to the body or housing 22 such that when it is installed and tightened on the body or housing 22, the end surface or shoulder 62 contacts or abuts the outwardly directed face 42 on the circumferential stop 40 before the threads 28 and 58 limit travel or the end of the body or housing 22 contacts the inside surface of the planar end panel 52 of the end cap 50. The end cap 50 also includes a smooth and unthreaded annular region 64 on its inner surface 56 adjacent the end surface or shoulder 62 against which the adjacent one of the O-ring seals 34 seats when the end cap 50 is assembled and fully seated on the end of the body or housing 22.

At the opposite end of the cylindrical body or housing 22, the male or external threads 28 are received within the valve body 10 which includes a cylindrical opening or fitting 70 having an inner surface 72 which includes internal or female threads 74 which are in all respects complementary to the male or external threads 28 on the body or housing 22. At the outer end of the cylindrical opening or fitting 70 resides an end surface or shoulder 76. It will be appreciated that the configuration of the cylindrical opening or fitting 70, that is, its axial length and the location of the end surface or shoulder 76 is again such that, during assembly, the adjacent outwardly directed face 42 of the adjacent circumferential stop 40 on the body or housing 22 contacts or abuts the end surface or shoulder 76 before other travel limiting contact either between the threads 28 and 74 or the end of the body or housing 22 and the interior of the valve body 10 is made. The inner surface 72 also includes a smooth and unthreaded annular region 78 adjacent the end ring or shoulder 76 against which the adjacent one of the O-ring seals 34 seats when the cylindrical body or housing 22 is assembled and fully seated in the cylindrical opening or fitting 70 of the valve body 10. As noted above, one of the fluid passageways 12 in the valve body 10 communicates with the interior volume of the accumulator 20.

Figure 4:
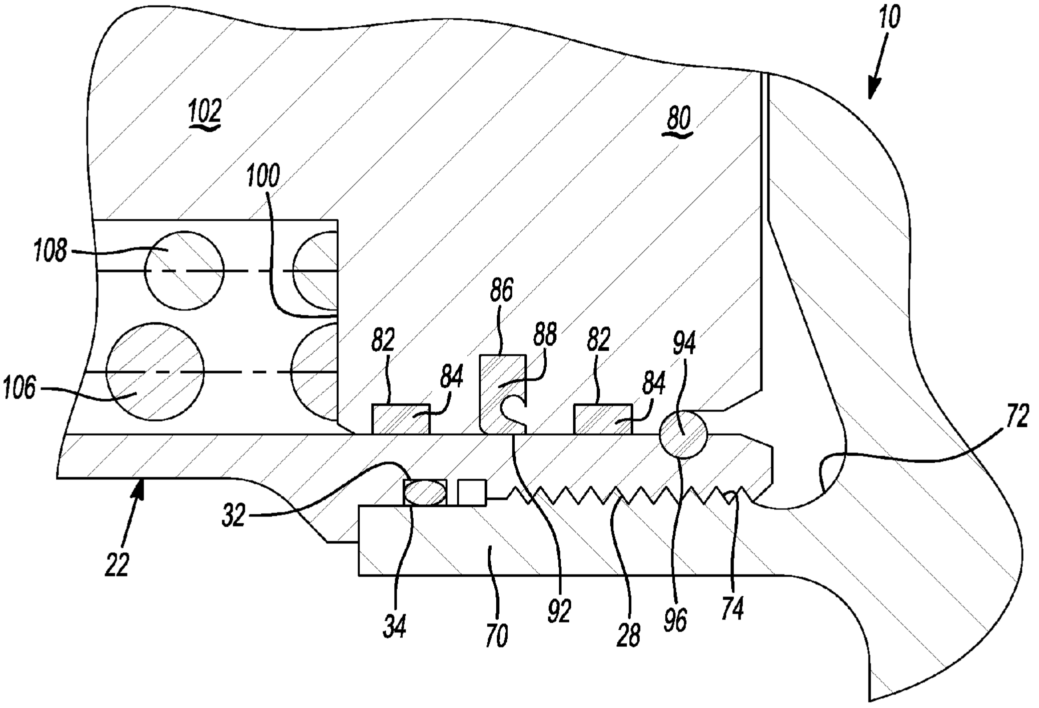
FIG. 4 is an enlarged, sectional view of a hydraulic accumulator according to the present invention illustrating the various seal components on the piston.

Referring now to FIGS. 2, 3 and 4, the cylindrical body or housing 22, as also noted above, defines a smooth, preferably machined inner surface 24 and receives a piston 80. The piston 80 includes a pair of spaced apart circumferential channel or grooves 82 which each receive and retain a guiding ring 84. The guiding rings 84 are preferably fabricated of PTFE and assist in maintaining true axial orientation of the piston 80 within the body or housing 22. Between the pair of channels or grooves 82 and the guiding rings 84 is a third, deeper circumferential channel or groove 86 which receives and retains a leap seal 88. The leap seal 88 includes a blade or wiper 92 and functions as the primary fluid seal between the piston 80 and the surface 24 of the body or housing 22. The blade or wiper 92 of the leap seal 88 is oriented such that increased pressure in the accumulator 20 forces or drives the blade or wiper 92 into closer, more intimate contact with the inner surface 24 of the body or housing 22 thereby improving the seal. The leap seal 88 is preferably fabricated of Vamac® or a similar material. Vamac is a registered trademark of the E. I. DuPont de Nemours Company for its brand of ethylene acrylic elastomers. An O-ring seal 94 of an elastomer resides in a channel or groove 96 on the inside surface 24 of the body or housing 22 adjacent its end proximate the valve body 10.

The piston 80 includes a shoulder 100 between the piston 80 proper and an intermediate diameter region 102 and an elongate shaft portion 104 which has a diameter smaller than the intermediate diameter region 102. Seated and received about the intermediate diameter region 102 and extending to the end cap 50 are a pair of nested compression springs: an outer compression spring 106 and an inner compression spring 108. Typically, the outer compression spring 106 will have a higher spring rate than the inner compression spring 108. Both of the compression springs 106 and 108 have a fully compressed length which is shorter than the distance from the end of the elongate shaft portion 104 to the shoulder 100. Thus, before high pressure in the accumulator 20, against the face of the piston 80, can fully compress or "bottom out" the compression springs 106 and 108, the end of the elongate shaft portion 104 contacts the inner surface of the end cap 50, as illustrated in FIG. 3.

Figure 5:
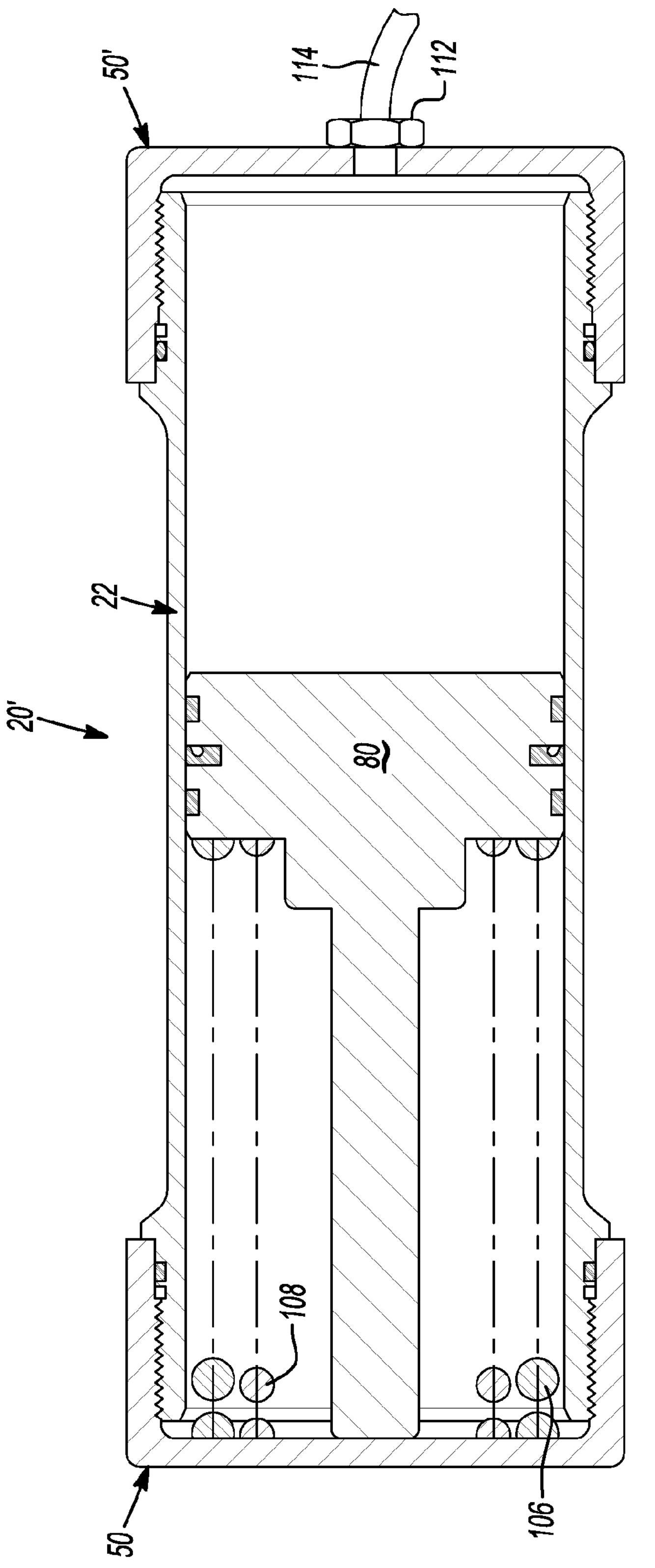
FIG. 5 is a full, sectional view of an alternate configuration of a hydraulic accumulator according to the present invention having two end caps and an inlet/outlet port.

Referring now to FIG. 5, an alternate configuration 20' of the accumulator 20 is illustrated. The accumulator 20' includes the cylindrical body or housing 22, a first end cap 50, the piston 80, the springs 106 and 108 and a second end cap 50' which is essentially similar to the first end cap 50 with the addition of an inlet/outlet port or fitting 112. The accumulator 20' is thus suited for mounting on a manifold or at a location remote from, for example, an automatic transmission to which it is connected by a hydraulic line 114.

Depending upon the application, the operating pressure range of the accumulators 20 and 20' may be in the range of from 275 kPa to 800 kPa or lower or higher. Depending upon the operating pressure range, the material from which the accumulators 20 and 20' are fabricated may be steel or aluminum. At lower pressures, fabrication from reinforced plastics is possible.

It will be appreciated that a hydraulic accumulator according to the present invention provides several benefits and advantages. First, from a manufacturing or fabrication standpoint, all the components of the hydraulic accumulator 20 can be lathe turned with no additional post processing. Thus, the hydraulic accumulator 20 is efficiently and readily manufactured on conventional equipment and machines. Second, the volume of the hydraulic accumulator 20 can be readily changed by adjusting the length of the cylindrical body or housing 22 and by using end caps 50 of varying lengths. Also, the length of the piston shaft 104, the length of the compression springs 106 and 108 and the spring rate of the compression springs can all be varied to suit a particular application. Third, the removable end cap(s) 50 facilitate rapid service of the piston 80, the various seals and the springs 106 and 108 if required.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic accumulator comprising, in combination, a cylindrical body having a pair of ends, each of said ends including male threads, a circumferential channel adjacent said threads, a shoulder adjacent said circumferential channel and an elastomeric seal disposed in said circumferential channel, an end cap having a closed end and female threads complementary to said male threads on one of said ends, a piston assembly fully disposed within said cylindrical body, said piston assembly including a piston and an elongate shaft portion, at least one compression spring disposed between said piston and said end cap, said elongate shaft portion having a length longer than a fully compressed length of said at least one compression spring, and an inlet member having female threads complementary to said male threads on another of said ends and defining a fluid passageway into said cylindrical body, wherein said male threads extend to said ends of said cylindrical body and said shoulders are disposed away from said ends of said cylindrical body.

2. The hydraulic accumulator of claim 1 further including a second compression spring.

3. The hydraulic accumulator of claim 1 wherein said piston assembly includes an intermediate diameter portion between said piston and said elongate shaft portion.

4. The hydraulic accumulator of claim 1 wherein said piston includes at least one circumferential channel and a resilient seal disposed in said channel.

5. The hydraulic accumulator of claim 1 wherein said inlet member is a component of a motor vehicle transmission.

6. The hydraulic accumulator of claim 1 wherein said inlet member is a second end cap.

7. A hydraulic accumulator comprising, in combination, a cylindrical body having a first end and a second end, each of said ends including male threads, a circumferential channel adjacent said threads, a shoulder adjacent said circumferential channel and an elastomeric seal disposed in said circumferential channel, an end cap having a closed end panel and female threads complementary to said male threads on said first end, a piston assembly disposed entirely within said cylindrical body, said piston assembly having a piston and an elongate shaft portion, at least one compression spring disposed between said piston and said end cap, and an inlet member having female threads complementary to said male threads on said second end and defining a fluid passageway into said cylindrical body, wherein said male threads extend to said ends of said cylindrical body and said shoulders are disposed adjacent said male threads and away from said ends of said cylindrical body.

8. The hydraulic accumulator of claim 7 further including a second compression spring.

9. The hydraulic accumulator of claim 7 wherein said piston includes at least one circumferential channel and a resilient seal disposed in said channel.

10. The hydraulic accumulator of claim 7 wherein said inlet member is a component of a motor vehicle transmission.

11. The hydraulic accumulator of claim 7 wherein said inlet member is a second end cap.

12. A hydraulic accumulator comprising, in combination, a cylindrical body having a first end and a second end, each of said ends including male threads, a circumferential channel adjacent said male threads, a shoulder adjacent said circumferential channel and an elastomeric seal disposed in said circumferential channel, an end cap having a closed end and female threads complementary to said male threads on said first end, a piston assembly fully disposed within said cylindrical body, said piston assembly having a piston body and an elongate shaft extending toward said closed end of said end cap, at least one compression spring disposed between said piston and said end cap, and an end member having female threads complementary to said male threads on said second end and defining a fluid passageway into said cylindrical body, wherein said male threads extend to said ends of said cylindrical body and said shoulders are disposed away from said ends of said cylindrical body.

13. The hydraulic accumulator of claim 12 wherein said piston includes at least one circumferential channel and a resilient seal disposed in said channel.

14. The hydraulic accumulator of claim 12 wherein said end member is a component of a transmission.

15. The hydraulic accumulator of claim 12 wherein said end member is a second end cap.

16. The hydraulic accumulator of claim 1 wherein said elongate shaft portion contacts said closed end cap before said at least one compression spring is fully compressed.

17. The hydraulic accumulator of claim 12 wherein said elongate shaft has a length longer than a fully compressed length of said at least one compression spring.

* * * * *